Aug. 16, 1960 G. W. RETTIE ET AL 2,949,508

TELEPHONE DIALING DEVICE

Filed Oct. 7, 1958 5 Sheets-Sheet 1

INVENTORS
George W. Rettie
Robert J. Hotchkiss

Aug. 16, 1960 G. W. RETTIE ET AL 2,949,508

TELEPHONE DIALING DEVICE

Filed Oct. 7, 1958 5 Sheets-Sheet 2

INVENTORS
George W. Rettie
Robert J. Hotchkiss

Aug. 16, 1960 G. W. RETTIE ET AL 2,949,508

TELEPHONE DIALING DEVICE

Filed Oct. 7, 1958 5 Sheets-Sheet 3

INVENTORS

George W. Rettie

Robert J. Hotchkiss

INVENTORS
George W. Rettie
Robert J. Hotchkiss

Aug. 16, 1960 G. W. RETTIE ET AL 2,949,508

TELEPHONE DIALING DEVICE

Filed Oct. 7, 1958 5 Sheets-Sheet 5

INVENTORS

George W. Rettie

Robert J. Hotchkiss 2,949,508

TELEPHONE DIALING DEVICE

George W. Rettie and Robert D. Hotchkiss, both of 2227 NE. 171st St., North Miami Beach, Fla.

Filed Oct. 7, 1958, Ser. No. 765,777

7 Claims. (Cl. 179—90)

This invention relates to telephone dialing devices and has for its object the provision of an automatic dialing device to be associated with a conventional telephone of the dial type.

It is also an object of this invention to provide an automatic dialing device adjustably mounted so that it may be placed in a position relative to any of the several types of conventional telephone instruments whereby it makes contact with the telephone instrument only when it is actually engaged in dialing a number.

The invention also has as an object the provision of an automatic dialing device which will complete the dialing of a predetermined telephone number whenever a single button is pressed.

It is also an object of this invention to provide an automatic dialing device which will upon the pressing of a selected button complete the dialing of one of a plurality of predetermined telephone numbers with which the device has been indexed.

It is a further object of the invention to provide an automatic dialing device which will in no way interfere with the normal operation of the telephone with which it is associated.

In accordance with these objects we have devised an automatic dialing device which provides 30 degrees of rotation of the dial or finger plate of a telephone instrument for each momentary impulse of current supplied to a solenoid and also provides for the continued advance of 30 degrees of rotation of the dial plate of the telephone instrument for each impulse of electric current so long as the momentary impulses of current continue to occur at specific intervals. At the conclusion of each group of electrical impulses, a pawl is automatically disengaged and the dial plate of the telephone instrument is allowed to return to its starting position. Groups of notches cut into the periphery of a motor driven cam operate a normally open switch to supply momentary electrical impules. Each group of notches in the cam consists of the number required to provide movement of the dial plate of the telephone instrument to dial one digit of a specific telephone number. The groups of notches in the periphery of the cam are separated sufficiently to allow time for the dial plate of the telephone instrument to return to its starting position. One revolution of the cam provides the impulses necessary to complete the dialing of any predetermined telephone number whether it consists of one digit only, such as required to dial O (Operator), in which case there would be only one group of notches in the cam or a telephone number of seven digits in which case there would be seven groups of notches cut in the periphery of the cam.

The various objects and advantages of our invention will become apparent from the following description and from the drawings in which:

Figure 3 is a sectional view taken along the line 34—34 of Figure 6 in which the dialing mechanism is shown in the normal position with the solenoids de-energized.

Figure 1:
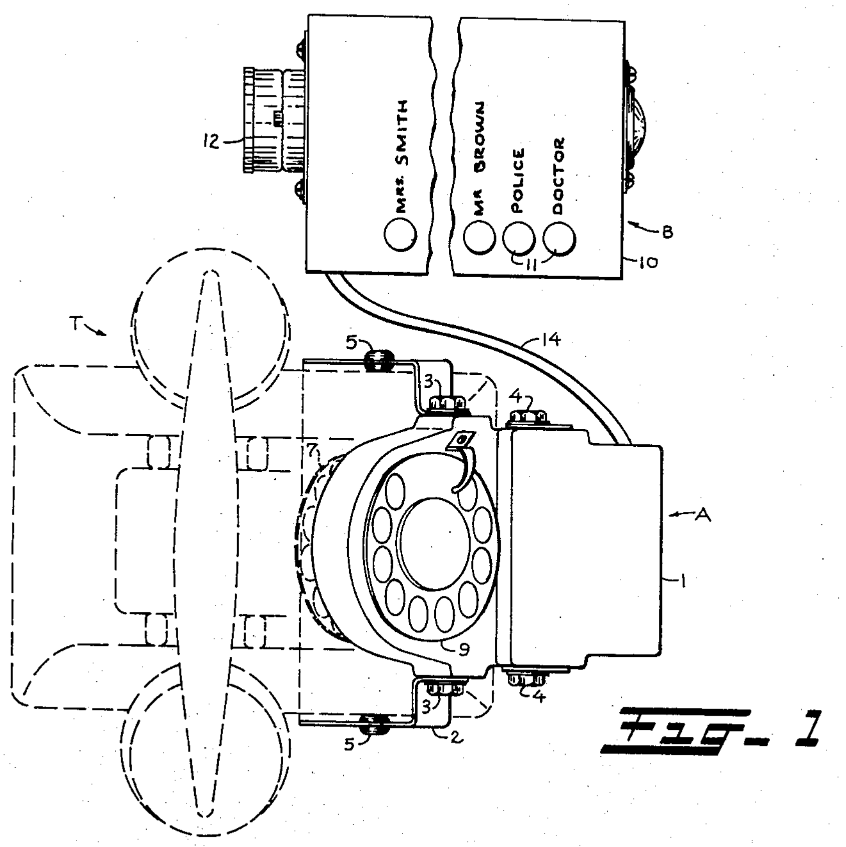
Figure 1 is a top plan view.
Figure 2:
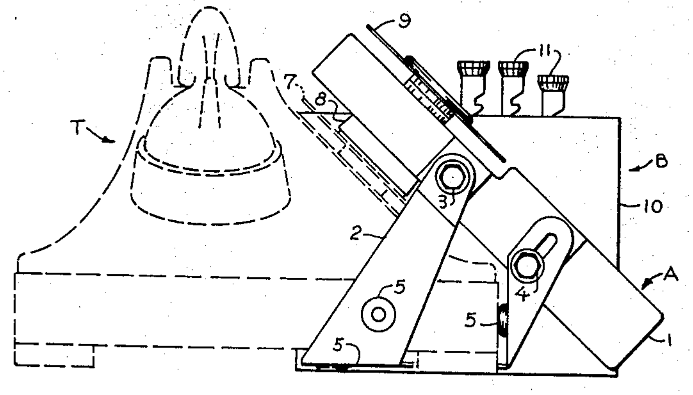
Figure 2 is a side elevational view.
Figure 6:
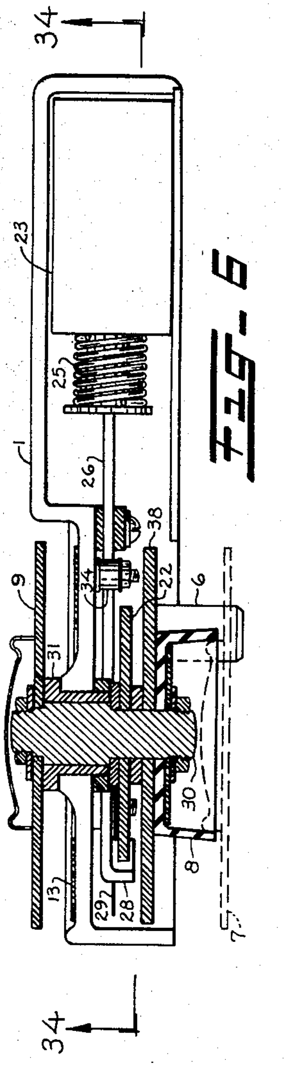
Figure 6 is a sectional view taken along the line 6—6 of Figure 5, and line 6—6 of Figure 4.
Figure 7:
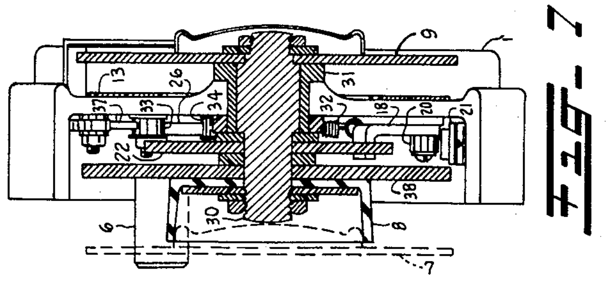
Figure 7 is a sectional view taken along the line 7—7 of Figure 5, and line 7—7 of Figure 4.
Figure 8:
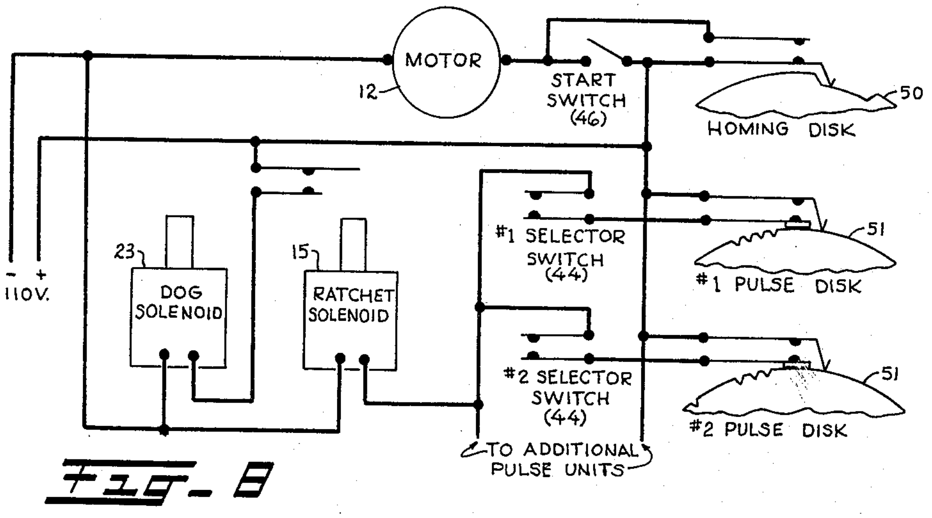
Figure 8 is a schematic wiring diagram.

Referring now to the drawings, in Fig. 1 and Fig. 2, the invention is shown associated with a conventional telephone set drawn in dashed lines and generally indicated as T with a dialing mechanism generally indicated as A held in the base 2 by pivot bolts 3 and locked in a position by lock bolts 4 so that physical contact with the telephone T is made only through rubber grommets 5 in the base 2 or through the dialing finger 6 (see Figs. 6 and 7) of the dialing mechanism A which when activated makes contact with the dialing disk 7 of the telephone T. Contact of the rubber cup 8 of the dialing mechanism A with dialing disk 7 should occur only when adjustments of the lock bolts 4 are being made or when the telephone T is being moved by lifting it from the common surface upon which both normally rest. When dialing mechanism A is properly adjusted, its position with relation to the telephone T is such that the dialing disk 9 of the dialing mechanism A which is exactly the same as dialing disk 7 of the telephone T is aligned with the dialing disk 7 and any movement of the one is imparted to the other through the finger 6 which is centered in the "0" hole of the dialing disk 7 of the telephone T. Visible through the finger holes of dialing disk 9 is an index plate 13 (see Figs. 6 and 7) which provides identification of the finger holes having the same letters and numerals visible through each finger hole as are visible or beside the corresponding finger hole of the dialing disk 7 of the telephone instrument T. Except when the dialing mechanism A is actually in operation, manipulating the dialing disk 9 is exactly the same as manipulating the dialing disk 7 of the telephone T.

Figure 4:
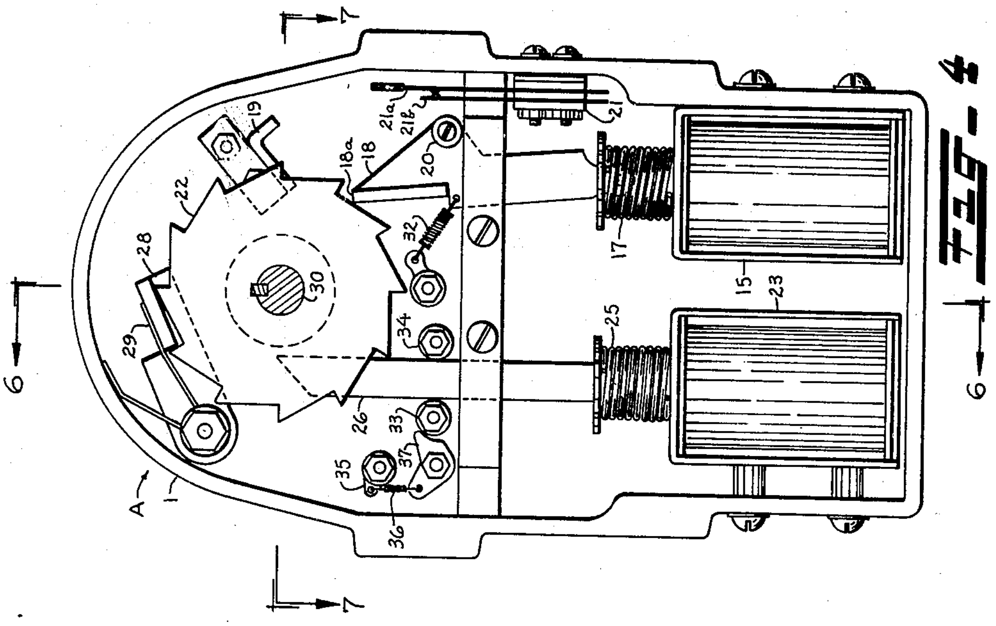
Figure 4 is a sectional view taken along the line 34—34 of Figure 6 in which the dialing mechanism is shown in the abnormal position with the solenoids energized.
Figure 5:
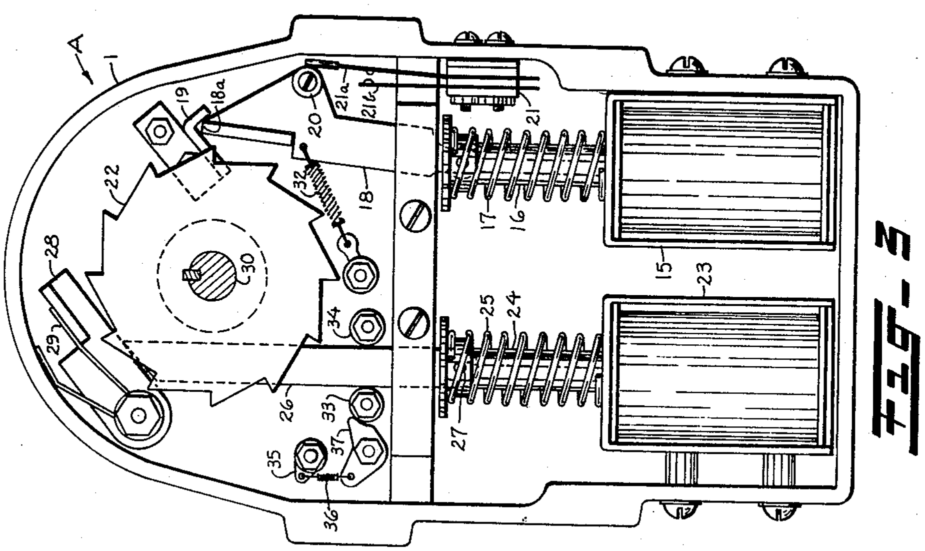
Figure 5 is a top plan view of the dialing mechanism.
Figure 5:
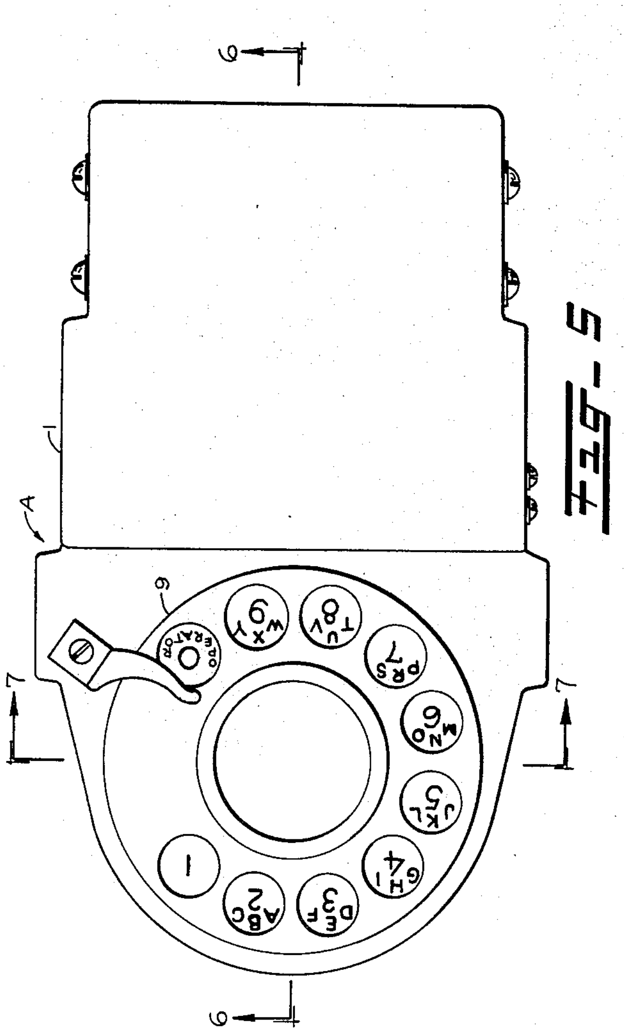

Having thus described the external appearance and location of the dialing mechanism A, we refer now to Fig. 3 and Fig. 4 which are internal views of the dialing mechanism A as it appears in the normal position in Fig. 3 and as it appears in the abnormal position in Fig. 4. In Fig. 3, the unenergized solenoid 15 has a pole piece 16 in its extended position under pressure of the spring 17 so that the end 18*a* of pawl 18 is held by the stop 19 at a point where the roller 20 is in contact with the blade 21*a* of normally closed switch 21, the blade 21a is not in contact with blade 21*b* of switch 21, and the end 18*a* of pawl 18 is clear of the ratchet gear 22. With pawl 18 in the position described where the switch 21 is held in an open position, the solenoid 23 is de-energized and has a pole piece 24 extended under pressure of spring 25 so that the pawl 26, which is connected to the pole piece 24 by a pin 27, is holding ratchet dog 28 clear of the ratchet gear 22. The thrust of spring 25 overcomes the pressure exerted by spring 29 and thus the dog 28 is held inoperative whenever the solenoid 23 is de-energized. In the normal position of the dialing mechanism A as described, the ratchet gear 22, which is keyed to shaft 30, is free to turn when dialing disk 9 (see Figs. 6 and 7) of the dialing mechanism A is rotated and has only that resistance to its rotation which is caused by the friction between shaft 30 and bearing 31.

Referring now to Fig. 4 which shows the dialing mechanism A in the abnormal position, the solenoid 15 is energized, the pole piece 16 is pulled in, the spring 17 is compressed, the pawl 18 is in contact with the ratchet gear 22 under the pull of spring 32 and switch 21 is in a closed position with the pin 20 of pawl 18 not in contact with the blade 21*a*. With switch 21 in a closed position, solenoid 23 is energized, pawl 26 is pulled out of contact with dog 28, and dog 28 is in contact with ratchet gear 22 under pressure of spring 29 so that counterclockwise rotation of ratchet gear 22 is possible, but clockwise rotation would be stopped by dog 28. When solenoid 15 is de-energized, the pressure of spring 17 forces the pawl 18 to rotate the ratchet gear 22 in a counterclockwise direction until the point 18*a* of pawl 18 strikes the stop 19 and the pawl 18 is forced out of contact with the ratchet gear 22 and the pin 20 on pawl 18 contacts the spring blade 21*a* and puts the switch 21 in an open position. When switch 21 is opened, solenoid 23 is de-energized and pawl 26, under pressure of spring 25, is forced out but its movement is restricted by the drag of roller 33 which acts as a brake. Adjustment of the spring mounting lug 35 provides more or less tension of spring 36 on the brake shoe 37 so that pawl 26 is delayed in contacting dog 28 and forcing it out of contact with ratchet gear 22. If the solenoid 15 is re-energized as soon as pawl 18 has contacted stop 19, the movement of pawl 18 re-closes switch 21, re-energizes solenoid 23 and pawl 26 is pulled in before it can contact dog 28 and force it into an inoperative position. So long as each energization of solenoid 15 occurs as soon as pawl 18 has reached stop 19, ratchet gear 22 will be rotated one notch in a counterclockwise direction for each energization of solenoid 15 and dog 28 will continue in an operative position preventing clockwise rotation of ratchet gear 22. When a delay in energizing solenoid 15 occurs, the switch 21 remains open, solenoid 23 is de-energized allowing pawl 26 to force dog 28 into the inoperative position and ratchet gear 22 is free to rotate in either direction.

When the dialing mechanism A is positioned over a telephone T, the dialing finger 6 which is fastened to finger plate 38 is centered in the "0" hole of the dialing disk 7. The finger plate 38, ratchet gear 22, and the dialing disk 9 are all keyed to the shaft 30 and when ratchet gear 22 is rotated by pawl 18, the dialing disk 7 of the telephone T is also rotated. Each cycle of motion of pawl 18 rotates the ratchet gear 22 and thus dialing disk 7 through 30 degrees of arc. Thus when momentary impulses of electric current are provided to solenoid 15 at intervals of time as previously described, dialing disk 7 is progressively rotated 30 degrees of arc for each impulse until a delay or a cessation in the flow of impulses occurs, when dog 28 is forced into the inoperative position and dialing disk 7, in response to a spring in the telephone T, rotates in the reverse direction until it is again in the "0" or starting position.

It is believed that it is clear from the foregoing that rotation of the dialing disk 7 to any desired multiple of 30 degrees of arc and its return to the "0" position, can be accomplished by providing solenoid 15 with groups of electrical impulses occurring at properly timed intervals. Since action of solenoid 23 is dependent upon the cycling of solenoid 15, it is only necessary to supply solenoid 15 with groups of properly timed impulses to provide both forward and reverse rotation of dialing disk 7.

Figure 9:
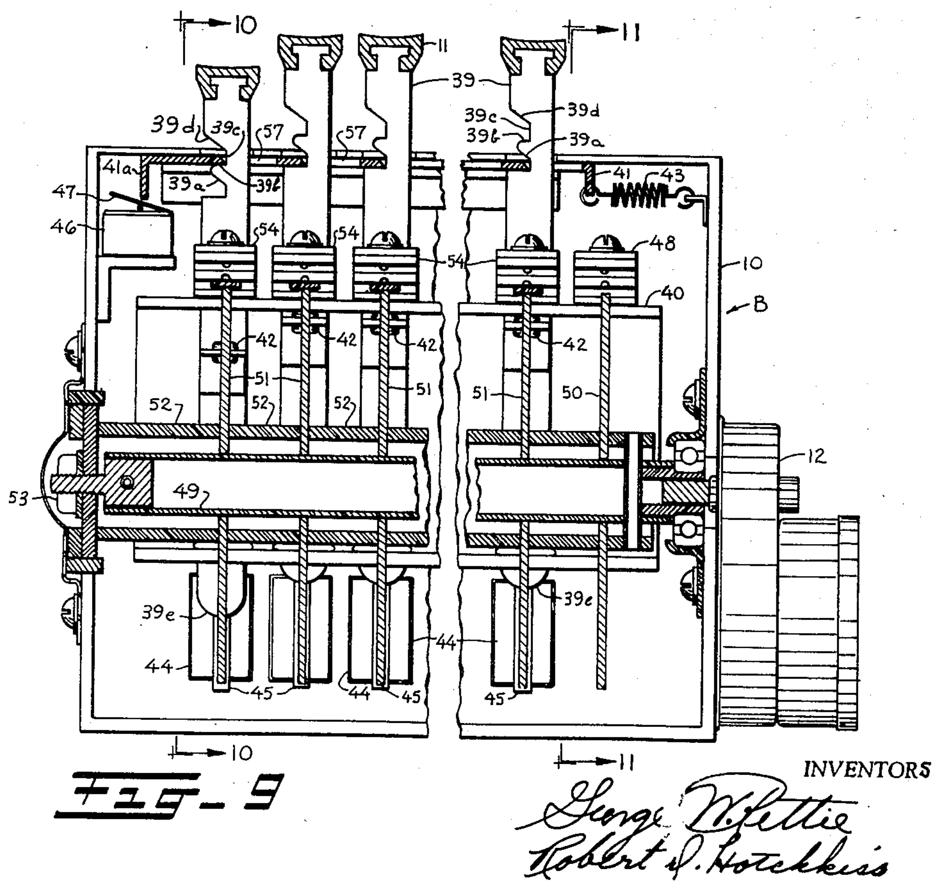
Figure 9 is a sectional view taken along the line 9—9 of Figure 10.
Figure 11:
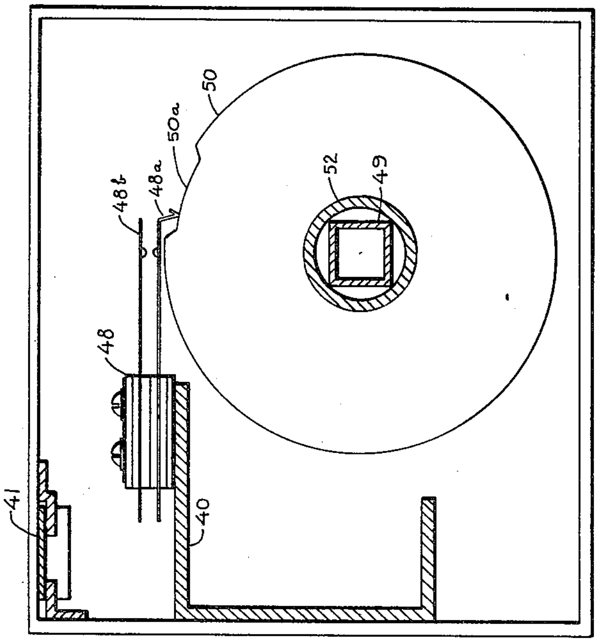
Figure 11 is a sectional view taken along the line 11—11 of Figure 9.

Also shown in Fig. 1 and Fig. 2 is a control mechanism generally indicated as B which is cable connected with the dialing mechanism A by cable 14. The control mechanism B is housed in a box 10 and has one or more buttons 11 representing a specific telephone station which has been selected either because it is the desire of the operator of the device to call it frequently or because it is a number which it would be desirable to call in an emergency. Suitable means are incorporated which provide that pressing of a selected button 11 releases any other button 11 which may already be depressed, momentarily closes a normally open switch to start the motor 12 and set the control mechanism B in operation, and locks the selected button 11 in a depressed position so that contact of a normally open selector switch is maintained until another of the buttons 11 is pressed. The buttons 11 are securely attached to vertical blades 39 (see Fig. 9) which are slidably mounted through slots in the mounting bracket 40 which is fastened to the side of box 10. Blades 39 are given a bias to rise vertically by thrust of spring 58 (Fig. 10) and are stopped at a given point by contact of the rubber grommet 42 with the mounting bracket 40. Each of blades 39 also passes through a slot 57 in the lock plate 41 which is slidably mounted on the inside of the top of box 10 with a bias to move in response to the pull of the spring 43. When a button 11 is pressed, point 39*a* moves lock plate 41 against the pull of spring 43 until point 39*b* passes through the slot 57 in lock plate 41 allowing lock plate 41 to retract until stopped by blade 39 at point 39*c*, while blade 39 is stopped from rising by contact of point 39*b* with the underside of lock plate 41 and switch 44 is held in a closed position by contact of point 39*e* with the spring blade 45 of switch 44. Depressing of a blade 39 to this point may not cause the release of other blades 39 which are already depressed and does not cause sufficient travel of the lock plate 41 so that point 41*a* contacts the momentary switch 46. When button 11 is depressed further, surface 39*d* forces lock plate 41 to move against the pull of spring 43 until any other blade 39 held by lock plate 41 is released and allowed to rise and, until the point 41*a* contacts the switch blade 47 of starter switch 46, to momentarily hold it in a closed position. When switch 46, which is in parallel with the homing switch 48 (see Fig. 11), is closed by movement of lock plate 41, current reaches motor 12 which, when energized, turns shaft 49, which is a square tubing, and the homing disk 50, which is of a non-electrical conducting rigid material and is keyed to the shaft 49 by having a square center hole. When homing disk 50 rotates, the switch blade 48*a* is forced up out of the depression 50*a* and switch 48 is held in a closed position until rotation of the homing plate 50 returns the depression 50*a* to a point where switch blade 48*a* moves out of contact with switch blade 48*b* and switch 48 is again in an open position. The length of the depression 50*a* in the periphery of the homing disk 50 is dependent upon the coasting of shaft 49 after the supply of current has been withdrawn from the motor 12 by the opening of switch 48 but is preferably such that upon the completion of a cycle of operation, a minimum of rotation of homing disk 50 is required before switch blade 48*a* is forced into contact with switch blade 48*b*. This is important so that closure of the starter switch 46, caused by pressure on button 11, can be held to as short a period of time as possible.

It is believed to be clear that each time starter switch 46 is held closed until homing disk 50 rotates sufficiently to cause closing of homing switch 48, the shaft 49 will rotate one revolution and stop until starter switch 46 is again closed by pressing button 11.

Also rotated when shaft 49 rotates are pulse disks 51 which are of a non-electrical conducting rigid material (see Fig. 10), are keyed to shaft 49 by having a square center hole, and held rigidly in place by pressure exerted through spacers 52 by tightening of the lock nut 53 on the extreme end of shaft 49. Mounted on bracket 40 over the center line of the pulse disks 51, are pulse switches 54 which are normally open switches which are in series with the selector switches 44 each one of which is associated with one of the pulse switches 54 and also in series with the solenoid 15 of the dialing mechanism A. The ends of switch blade 55 and switch blade 56 of pulse switch 54 both bear against the periphery of pulse disk 51 and are adjusted so that in their normal position the contacts 55$a$ and 56$a$ are spaced about .010 to .015 apart. The end 55$b$ of switch blade 55 has a surface contact with no more than one degree of arc of the periphery of the pulse disk 51 while the end 56$b$ of switch blade 56 has a surface contact with about six degrees of arc of the periphery of the pulse disk 51. The notches 51$a$ cut in the periphery of the pulse disk 51 extend for approximately two degrees of arc of the periphery of pulse disk 51 and are from .030 to .040 inch in depth. When pulse disk 51 rotates, contact point 55$b$ of switch blade 55, due to its small contact area, enters the notches 51$a$ and since contact point 56$b$ of switch blade 56 spans the notches 51$a$, the contacts 55$a$ and 56$a$ close each time contact point 56$b$ enters a notch 51$a$ and an impulse of current is supplied to solenoid 15 through selector switch 44. The speed of rotation of shaft 49, the diameter of pulse disk 51, and the spacing of the notches 51$a$ are such that the impulses of current provided by pulse switch 54 occur at proper intervals of time to assure that operation of solenoid 15 will result in progressive rotation of dialing disk 7 of the telephone T as previously described.

Figure 10:
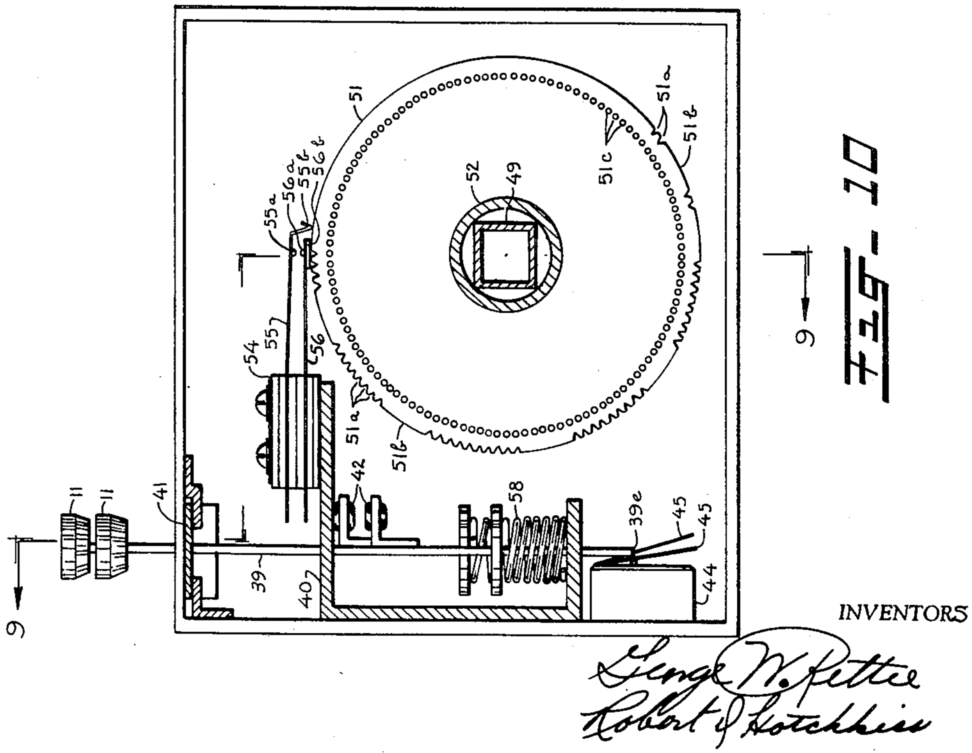
Figure 10 is a sectional view taken along the line 10—10 of Figure 9.

In Fig. 10, a dialing disk 51 is shown with groups of notches 51$a$ cut in the periphery separated by sections of the periphery identified as 51$b$. When pulse disk 51 is rotating, these sections 51$b$ provide that the pulse switch 54 will remain open and solenoid 15 inactive until dialing disk 7 returns to the "0" or starting position after each group of notches 51$a$ provides rotation to the point required to dial one specific digit of a given telephone number. The groups of notches 51$a$ cut in the dialing disk 51 as illustrated in Fig. 10 provide for the dialing of the telephone number FR 9–8811 or converted to numerals 73–9–8811. It will be noted however that the groups of notches in the disk 51 in Fig. 10 consist of 4–8–10–9–9–2 and 2 notches 51$a$ instead. This is necessary because the dialing disk 7 must be rotated 30 degrees of arc more for each digit it is desired to dial than the equivalent multiple of 30 degrees of arc expressed by the numeral of the digit. Thus to dial the numeral one, the dialing disk 7 must be rotated two segments of arc of 30 degrees each; to dial the numeral 2, the dialing disk 7 must be rotated 3 segments of arc of 30 degrees each and so on until to dial 10 (or 0) requires that dial plate 7 be rotated eleven segments of 30 degrees of arc. Simply expressed, there must be one notch more in each group of notches than the numeral which that group of notches is to dial of any given digit of a telephone number.

To assure accuracy in indexing the pulse disk 51 with the notches 51$a$, the pulse disk 51 has 120 depressions or holes 51$c$ which may be drilled, punched or cast into it at 3 degrees of arc so that during the operation of indexing, the disk 51 may be held securely positioned or moved accurately in increments of 3 degrees. The depressions 51$c$ may be marked in advance of the indexing operation to show clearly where the notches 51$a$ are to be cut and where sections 51$b$ are to remain uncut. It is deemed unnecessary to detail here the actual method of cutting, filing or sawing the notches 51$a$ since this could be done in a number of ways. The disk 51 could be of injection moulded plastic with segments of reduced section provided at 3 degrees of arc in the periphery so that with the use of common household tools such as a pliers or heavy tweezers these sections could be broken out to form notches 51$a$.

It is believed that the foregoing has made it clear how our invention effects the dialing of a telephone number. To use our invention, the person desiring to make a telephone call lifts the receiver of the telephone with which the invention is associated and presses down on the button which he selects, until any other button which may have been depressed is released and rises. If the button he chooses is already depressed, he merely depresses it further for a moment and then releases it. When he has finished the call, he replaces the receiver and all elements of the invention and the telephone are prepared for the next call whether it be the desire of the person to use the automatic dialing mechanism or to use the dialing disk to call a number not indexed on the invention.

This description of the mechanical operation and the manner in which our invention is used makes it clear that we have provided an automatic dialing device which fully satisfies the objects previously stated as being desirable in a device of this kind.

Having thus described our invention what we claim as new and desire to secure by Letters Patent of the United States is as follows:

1. An automatic dialing device for dial telephones having: dial engaging means; a first solenoid activated pawl means to rotate said dial engaging means; a second solenoid activated pawl means to control the direction of rotation of said dial engaging means; switch means operated by said first solenoid activated pawl means to control cycling of said second solenoid activated pawl means; motor driven cam disks having notches indexed in their periphery; and switch means to engage the notches in the periphery of said cam disks to provide momentary electrical impulses in timed groups to the said first solenoid activated pawl means.

2. An automatic dialing device for dial telephones which includes: dial engaging means; a first solenoid activated pawl means for rotating said dial engaging means in one direction; a second solenoid activated pawl means to prevent rotation of said dial engaging means in the opposite direction when energized, and permit rotation of the said dial engaging means in either direction when de-energized; switch means operated by the said first solenoid operated pawl means to control said second solenoid operated pawl means; and means to provide groups of electrical impulses to said first solenoid operated pawl means timed as to intervals between impulses and between the groups of impulses, including a motor, cam disks with groups of notches indexed in their periphery, and switch means operated by the notches in the periphery of the said cam disks.

3. An automatic dialing device which comprises: a plurality of means to produce electrical impulses in timed groups representing the digits of telephone numbers including circular cam disks having notches in their periphery disposed in groups with each group of notches representing one digit of a given telephone number and normally open switches operated by the groups of notches in the said circular cam disks to effect a momentary closure of the said normally open switches for each of the said notches when the said circular cam disks are rotated; means to provide selection and initiation of operation of the said impulse producing means including buttons, blades, and switches; means to drive and control the said impulse producing means including a motor, a cam disk, and a switch; means to employ the said groups of electrical impulses to effect the rotation of the dialing disk of a telephone in one direction to an extent of arc determined by the number of impulses in a given group and to permit its rotation in the opposite direction to an equal extent of arc during the interval between the said groups of impulses including a first solenoid operated pawl to be activated by the said groups of electrical impulses, a ratchet gear rotated by the said first solenoid operated pawl to effect rotation of the said dialing disk in one direction, a switch operated by the said first solenoid operated pawl, a second solenoid operated pawl activated by the said switch, a dog operated by the said second solenoid operated pawl disposed to engage the said ratchet gear and prevent its rotation in one direction whenever the said first solenoid operated pawl is in operation and to permit rotation of the said ratchet gear in the opposite direction whenever the said first solenoid activated pawl is not in operation; means to engage the dialing disk of a telephone to effect its rotation either by the said groups of electrical impulses or by manual effort including a dialing disk similar to the dialing disk of a telephone, keyed to one end of a shaft on which is also keyed the said ratchet gear and a plate keyed to the other end of the said shaft and having a finger which is introduced into the "0" hole of the dialing disk of a telephone so that when the said means to engage the dialing disk of a telephone is positioned and aligned with the dialing diks of a telephone, rotation of any one of the three, the said dialing disk of the said engaging means, the said ratchet gear, or the said dialing disk of the telephone with which they are associated, produces an equivalent rotation of the other two; and adjustably positionable bracket means to provide for the positioning and alignment of the said dial engaging means with the dialing disk of any one of the several types of telephone instruments commonly in use.

4. An automatic dialing device for dial telephones as claimed in claim 2 wherein the switch means to provide groups of electric impulses comprise: two flexible contact blades held in a spaced apart relationship by contact of the ends of the said contact blades with the periphery of a circular disk having notches into which one of the said contact blades can move when the said circular disk is rotated and into which the other contact blade cannot move because its greater area of contact with the periphery of the said circular disk spans the said notches so that when the said one of the said contact blades moves into one of the said notches it makes contact with the said other contact blade.

5. An automatic dialing device for dial telephones as claimed in claim 3 in which the means to drive and to control the cycles of operation of the impulse disks includes: a motor; a switch having two flexible contact blades; and a circular disk which has a segment of lesser diameter, with the said switch mounted with relation to the said circular disk so that when the one of the said contact blades bears against the segment of lesser diameter it is out of contact with the other of the said contact blades and the circuit to the said motor is open, but when the momentary closure of a starting circuit to the said motor causes rotation of the said circular disk, the said one of the contact blades is caused to bear against the periphery of the said circular disk and move into contact with the said other of the contact blades holding a circuit to the said motor closed until the said one of the contact blades again bears against the segment of reduced diameter of the said circular disk and moves out of contact with the said other contact blade opening the circuit to the said motor and stopping the rotation of the said circular disk.

6. An automatic dialing device for dial telephones as claimed in claim 3 which has means to adjustably control the speed of movement of the solenoid activated pawl which operates the ratchet dog including rollers, a spring, and a brake shoe disposed to permit unrestricted movement of the said pawl when it is moving in response to the pull of the solenoid, and restricted movement of the said pawl when it is moving in response to the thrust of a spring when the solenoid is de-energized.

7. An automatic dialing device for dial telephones as claimed in claim 3 in which the means to provide selection and initiation of operation of the impulse producing means includes a plurality of blades slideably mounted with a bias to rise vertically and having two notches near the upper end, a plurality of selector switches mounted proximate to the lower end of the said blades, a plate slideably mounted and having slots for each of the said blades to pass through, and a spring which gives the said plate a bias to enter the lower notches in the said blades when they are not depressed and to enter the upper notches in the said blades and lock them against the bias to rise whenever the said blades are depressed to a given point, except that when one of the said blades is fully depressed the said plate is moved to a further point so that the end of the said plate is in contact with a momentary starting switch which initiates the operation of the said impulse producing means, the slots in the said plate are out of contact with any other of the said blades allowing the said any other blades to rise, and when the said one blade is allowed to rise to the said given point the end of the said plate moves out of contact with the said momentary starting switch, and the slot in the said plate enters the upper notch in the said one of the blades locking it from further rise and in a position where its lower end is in contact with and holding in a closed position one of the said plurality of selector switches.

References Cited in the file of this patent

UNITED STATES PATENTS 2,763,727 Demeulenaere ---------- Sept. 18, 1956